United States Patent
Balter et al.

(10) Patent No.: US 12,315,387 B2
(45) Date of Patent: May 27, 2025

(54) SYSTEM AND METHOD FOR TRAINING SIMULATION OF A SURGICAL ROBOTIC SYSTEM

(71) Applicant: Covidien LP, Mansfield, MA (US)

(72) Inventors: Max L. Balter, Newton, MA (US); William J. Peine, Ashland, MA (US)

(73) Assignee: Covidien LP, Mansfield, MA (US)

( * ) Notice: Subject to any disclaimer, the term of this patent is extended or adjusted under 35 U.S.C. 154(b) by 0 days.

(21) Appl. No.: 17/796,455

(22) PCT Filed: Dec. 22, 2020

(86) PCT No.: PCT/US2020/066509
§ 371 (c)(1),
(2) Date: Jul. 29, 2022

(87) PCT Pub. No.: WO2021/158306
PCT Pub. Date: Aug. 12, 2021

(65) Prior Publication Data
US 2023/0047358 A1 Feb. 16, 2023

Related U.S. Application Data

(60) Provisional application No. 62/970,454, filed on Feb. 5, 2020.

(51) Int. Cl.
G09B 23/28 (2006.01)
(52) U.S. Cl.
CPC ............ *G09B 23/28* (2013.01); *G09B 23/285* (2013.01)
(58) Field of Classification Search
CPC .............................. G09B 23/28; G09B 23/285
See application file for complete search history.

(56) References Cited

U.S. PATENT DOCUMENTS

| 2010/0234857 | A1  | 9/2010  | Itkowitz et al. |
| 2015/0375327 | A1* | 12/2015 | Becker ...................... G06T 1/00 |
|              |     |         | 219/130.01 |
| 2016/0351070 | A1* | 12/2016 | Aillon-Sohl ........... G16H 20/70 |
| 2018/0250086 | A1  | 9/2018  | Grubbs |
| 2019/0378610 | A1* | 12/2019 | Barral ..................... G09B 19/24 |

OTHER PUBLICATIONS

International Search Report and Written Opinion dated Mar. 5, 2021 issued in corresponding PCT Appln. No. PCT/US2020/066509.

* cited by examiner

*Primary Examiner* — Timothy A Musselman
(74) *Attorney, Agent, or Firm* — Carter, DeLuca & Farrell LLP

(57) ABSTRACT

A surgical robotic system includes a surgical console and a training simulation console operably coupled to the surgical console. The surgical console includes a display and a user input device configured to generate a user input. The training simulation console includes a memory, a simulator, a master slave controller, and a simulation controller operably coupled to the simulator and the master slave controller. The memory is configured to store session data and instrument information. The simulator is configured to initialize a session. The master slave controller is configured to receive input positions from the user input device and to determine desired drive commands for the robotic arm or instrument drive unit. The simulation controller is configured to simulate in the session, operating of at least one of the robotic arm or the instrument drive unit.

20 Claims, 5 Drawing Sheets

SYSTEM AND METHOD FOR TRAINING SIMULATION OF A SURGICAL ROBOTIC SYSTEM

CROSS REFERENCE TO RELATED APPLICATIONS

The present application is a National Stage Application under 35 U.S.C. § 371 (a) of PCT/US2020/066509, filed Dec. 22, 2020, which claims the benefit of and priority to U.S. Patent Provisional Application No. 62/970,454 filed on Feb. 5, 2020. The entire disclosures of the foregoing applications are incorporated by reference herein.

FIELD

The present technology is generally related to a robotic surgical system, in particular, a training simulation for simulating surgical techniques of a surgical robotic system.

BACKGROUND

Surgical robotic systems are currently being used in minimally invasive medical procedures. Some surgical robotic systems include a surgical console controlling a surgical robotic arm and a surgical instrument having an end effector (e.g., forceps or grasping instrument) coupled to and actuated by the robotic arm.

Each of the components, e.g., surgical console, robotic arm, etc., of the surgical robotic system may be embodied in a training simulator. Thus, when surgeons require practice with the surgical robotic systems, a simulator of the surgical robotic systems provides the surgeon with the ability to practice common techniques used in robotic surgical procedures.

SUMMARY

This disclosure generally relates to a surgical robotic system including a training simulation console for providing surgeons with training exercises to practice robotic procedures by mapping input from a surgical console to a virtual surgical robotic system.

In one aspect, the present disclosure provides a surgical robotic system including a surgical console, a training simulation console, and a simulation controller. The surgical console includes a display and a user input device configured to generate a user input. The training simulation console is operably coupled to the surgical console. The training simulation console includes a memory, a simulator, and a master slave controller. The memory is configured to store session data and instrument information. The simulator is configured to initialize a session. The master slave controller is configured to receive input positions from the user input device and to determine a drive command for at least one of a movable cart, a robotic arm, or an instrument drive unit. The simulation controller is operably coupled to the simulator and the master slave controller. The simulation controller is configured to simulate during the session, operation of at least one of the robotic arm or the instrument drive unit.

In aspects, the simulation controller may be configured to determine an initial instrument pose and an initial camera pose based on the session data and the instrument information.

In aspects, the simulation controller may be further configured to determine an appropriate action of at least one of the movable cart, the robotic arm, or the instrument drive unit based on a machine state.

In aspects, the simulation controller may be further configured to map the drive command for at least one of the robotic arm or the instrument drive unit based on the machine state, to an instrument function in the simulator.

In aspects, the simulation controller may be further configured to determine an orientation of at least one of the movable cart, the robotic arm, or the instrument drive unit in the session.

In aspects, the orientation of at least one of the movable cart, the robotic arm, or the instrument drive unit may be determined based an initial tool center point position relative to a remote center of motion position.

In aspects, a desired instrument position is determined based on the drive command for the at least one of the robotic arm or the instrument drive unit.

In aspects, the session data may include at least one of a scenario name, an initial position of an instrument, a name of the instrument, or a functionality of the instrument.

In aspects, the instrument information may include at least one of a maximum joint limit, a minimum joint limit, or a kinematic parameter.

In aspects, the master slave controller may be further configured to provide haptic feedback to the user input device based on virtual movement of at least one of the robotic arm or the instrument drive unit.

In another aspect, the disclosure provides a method of simulating surgical techniques of a surgical robotic system. The method includes receiving, at a surgical console, input positions and a drive command from a user; receiving session data and instrument information at a training simulation console operably coupled to the surgical console and initializing a session on the training simulation console; and simulating, based on the session data, the instrument information, the input positions and the drive command, during the session operation of at least one of a movable cart, a robotic arm, or an instrument drive unit of the surgical robotic system on a display.

In aspects, the session data includes at least one of a scenario name, an initial position of an instrument, a name of the instrument, or a functionality of the instrument.

In aspects, the instrument information includes at least one of a maximum joint limit, a minimum joint limit, or a kinematic parameter.

In aspects, initializing the session on the training simulation console may include determining, based on the session data and the instrument information, an initial instrument pose and an initial camera pose.

In aspects, simulating the operation of at least one of the movable cart, the robotic arm, or the instrument drive unit may include determining, based on a machine state, an appropriate action for at least one of the movable cart, the robotic arm, or the instrument drive unit.

In aspects, simulating the operation of at least one of the movable cart, the robotic arm, or the instrument drive unit may include mapping, based on the machine state, the drive command for at least one of the movable cart, the robotic arm, or the instrument drive unit to an instrument function.

In aspects, simulating the operation of at least one of the movable cart, the robotic arm, or the instrument drive unit may include determining an orientation of at least one of the movable cart, the robotic arm, or the instrument drive unit in the session.

In aspects, the orientation of at least one of the movable cart, the robotic arm, or the instrument drive unit may be determined based on an initial tool center point position relative to a remote center of motion position.

In aspects, simulating the operation of at least one of the movable cart, the robotic arm, or the instrument drive unit may include determining a desired instrument pose, based on the drive command, of at least one of the movable cart, the robotic arm, or the instrument drive unit.

In aspects, the method may further include providing haptic feedback to the user based on a virtual movement of at least one of the robotic arm or the instrument drive unit.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
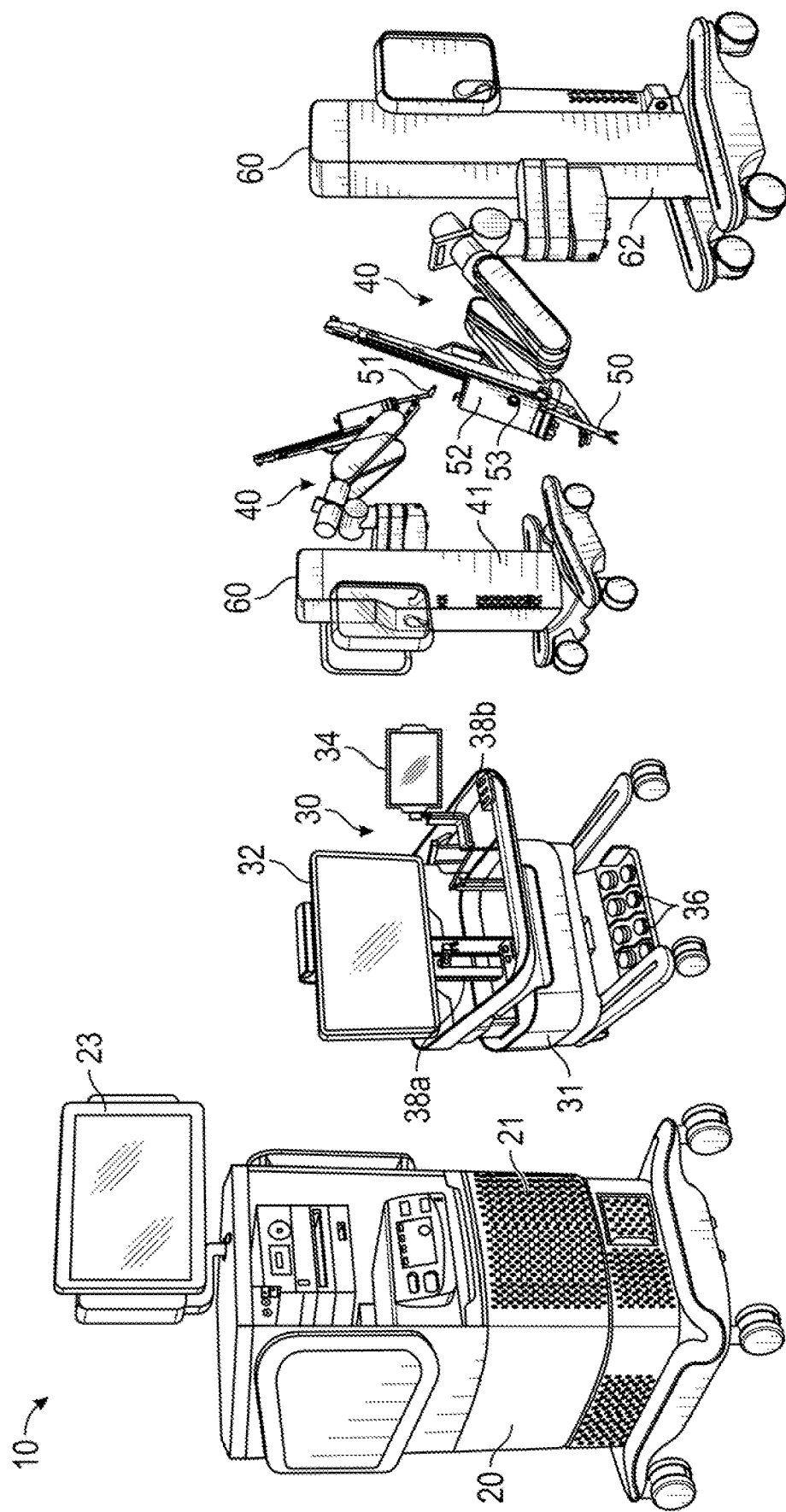
FIG. 1 is a schematic illustration of a surgical robotic system including a control tower, a console, and one or more surgical robotic arms in accordance with aspects of the present disclosure.

The presently disclosed surgical robotic systems are described in detail with reference to the drawings, in which like reference numerals designate identical or corresponding elements in each of the several views.

As will be described in detail below, the present disclosure is directed to a surgical robotic system which includes a surgical console, a control tower, a training simulator console, and one or more movable carts having a robotic arm coupled to a setup arm. The training simulator console is configured to allow for practice of robotic procedures based on the selected training exercise in the training simulator console. The surgical console receives user input through one or more interface devices, which, the training simulator console maps to a virtual surgical robotic arm. The virtual surgical robotic arm includes a controller, which is configured to process the movement command and to generate a simulated position command for virtually moving the virtual robotic arm in response to the movement command.

The term "application" may include a computer program designed to perform functions, tasks, or activities for the benefit of a clinician. Application may refer to, for example, software running locally or remotely, as a standalone program or in a web browser, or other software which would be understood by one skilled in the art to be an application. An application may run on a controller or a user device, including, for example, a mobile device, an IOT device, or a server system.

The term "network," whether plural or singular, as used herein, denotes a data network, including, but not limited to, the Internet, Intranet, a wide area network, or a local area networks, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 802.15.4-2003 standard for wireless personal area networks (WPANs)).

With reference to FIG. 1, a surgical robotic system 10 includes a control tower 20, which is connected to all of the components of the surgical robotic system 10 including a surgical console 30 and one or more robotic arms 40. Each of the robotic arms 40 includes a surgical instrument 50 removably coupled thereto. Each of the robotic arms 40 is also coupled to a movable cart 60.

The surgical instrument 50 is configured for use during minimally invasive surgical procedures. Alternatively, the surgical instrument 50 may be configured for open surgical procedures. In aspects, the surgical instrument 50 may be an endoscope configured to provide a video feed for the user, may be an electrosurgical forceps configured to seal tissue by compression tissue between jaw members and applying electrosurgical current thereto, or may be a surgical stapler including a pair of jaws configured to grasp and clamp tissue whilst deploying a plurality of tissue fasteners, e.g., staples, and cutting stapled tissue.

Each of the robotic arms 40 may include a camera 51 configured to capture video of the surgical site. The camera 51 may be a stereoscopic camera and may be disposed along with the surgical instrument 50 on the robotic arm 40. The surgical console 30 includes a first display 32, which displays a video feed of the surgical site provided by camera 51 of the surgical instrument 50 disposed on the robotic arms 40, and a second display device 34, which displays a user interface for controlling the surgical robotic system 10. The surgical console 30 also includes a plurality of user interface devices, such as foot pedals 36 and a pair of handle controllers 38a and 38b which are used by a user to remotely control robotic arms 40, e.g., a teleoperation of the robotic arms 40 via the surgical console.

The control tower 20 includes a display 23, which may be a touchscreen, and outputs on the graphical user interfaces (GUIs). The control tower 20 also acts as an interface between the surgical console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgical console 30, in such a way that robotic arms 40 and the surgical instrument 50 execute a desired movement sequence in response to input from the foot pedals 36 and the handle controllers 38a and 38b.

Each of the control tower 20, the surgical console 30, and the robotic arm 40 includes a respective computer 21, 31, 41. The computers 21, 31, 41 are interconnected to each other using any suitable communication network based on wired or wireless communication protocols.

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
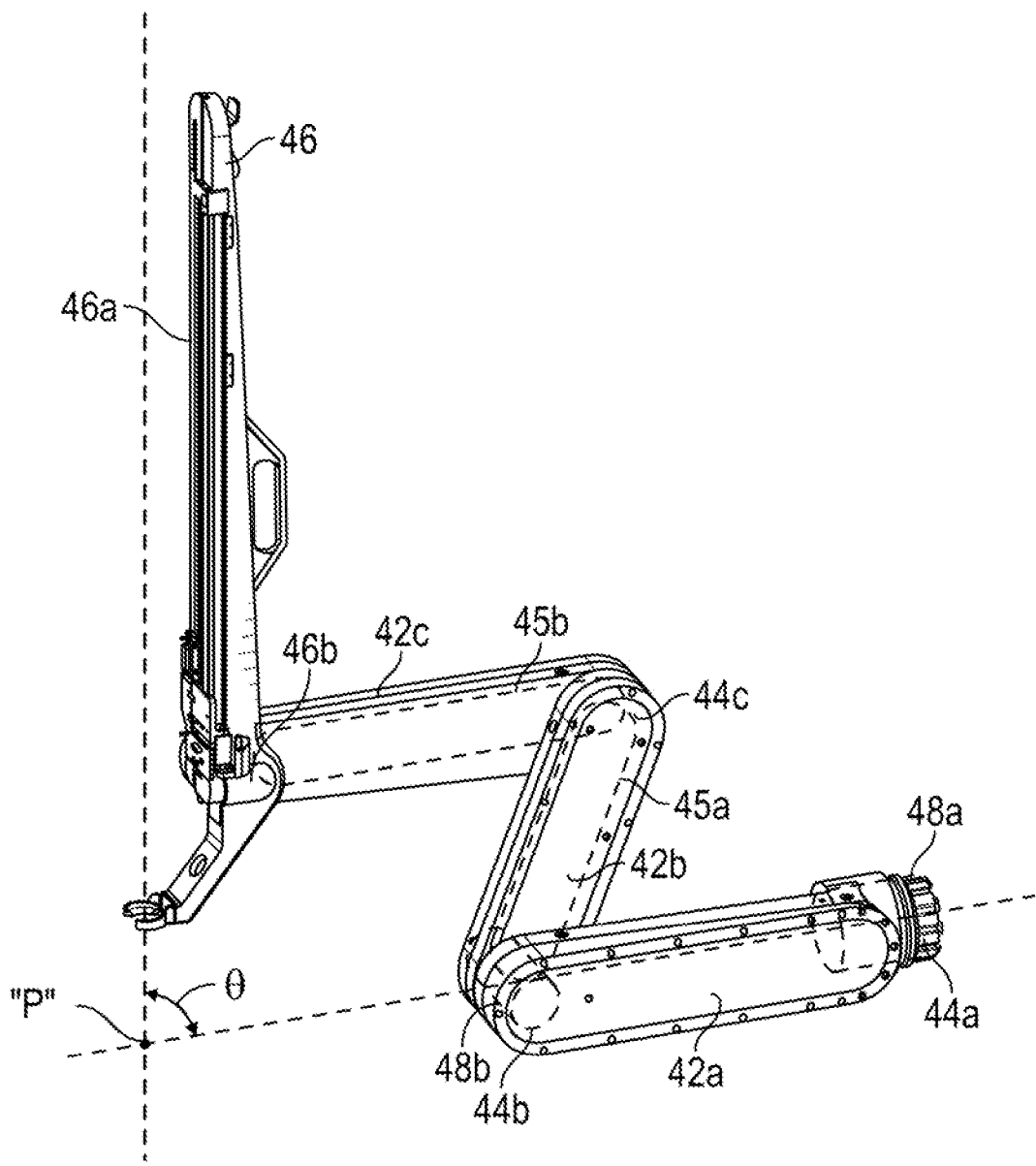
FIG. 2 is a perspective view of a surgical robotic arm of the surgical robotic system of FIG. 1.
Figure 3:
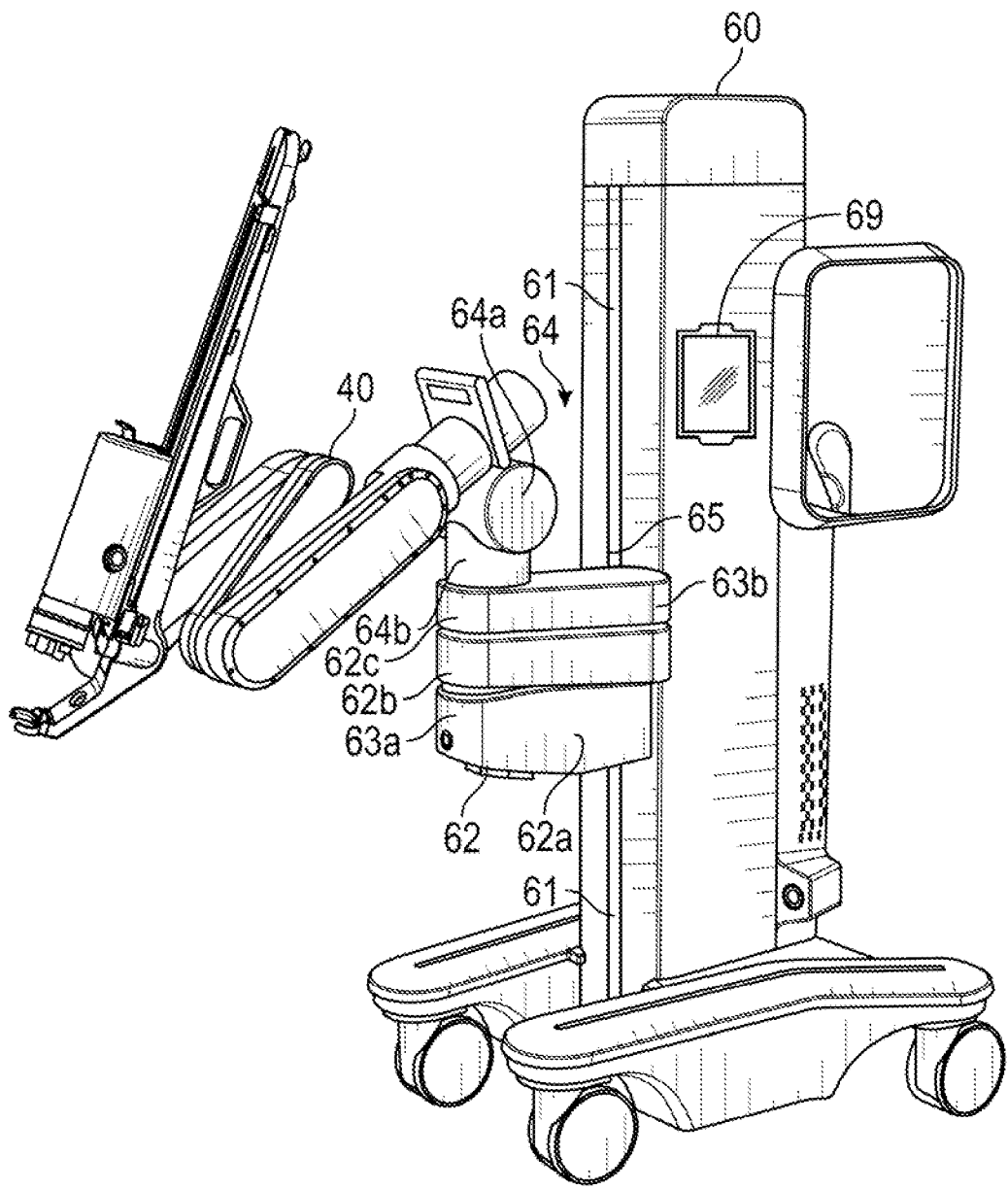
FIG. 3 is a perspective view of a setup arm with the surgical robotic arm of the surgical robotic system of FIG. 1.

With reference to FIG. 2, each of the robotic arms 40 may include a plurality of links 42a, 42b, 42c, which are interconnected at joints 44a, 44b, and 44c, respectively. The joint 44a is configured to secure the robotic arm 40 to the movable cart 60 and defines a first longitudinal axis. With reference to FIG. 3, the movable cart 60 includes a lift 61 and a setup arm 62, which provides a base for mounting of the robotic arm 40. The lift 61 allows for vertical movement of the setup arm 62. The movable cart 60 also includes a display 69 for displaying information pertaining to the robotic arm 40.

The setup arm 62 includes a first link 62a, a second link 62b, and a third link 62c, which provide for lateral maneuverability of the robotic arm 40. The links 62a, 62b, 62c are interconnected at joints 63a and 63b, each of which may include an actuator (not shown) for rotating the links 62a and 62b relative to each other and the link 62c. In particular, the links 62a, 62b, 62c are movable in their corresponding lateral planes that are parallel to each other, thereby allowing for extension of the robotic arm 40 relative to the patient (e.g., surgical table). In some instances, the robotic arm 40 may be coupled to the surgical table (not shown). The setup arm 62 includes controls 65 for adjusting movement of the links 62a, 62b, 62c, as well as the lift 61.

The third link 62c includes a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

The robotic arm 40 also includes a plurality of manual override buttons 53 disposed on instrument drive unit 52 and the setup arm 62, which may be used in a manual mode. The user may press one or more of the buttons 53 to move the component associated with the button 53.

With reference to FIG. 2, the robotic arm 40 also includes a holder 46 defining a second longitudinal axis and configured to receive the instrument drive unit 52 (FIG. 1) of the surgical instrument 50, which is configured to couple to an actuation mechanism of the surgical instrument 50. Instrument drive unit 52 transfers actuation forces from its actuators to the surgical instrument 50 to actuate components (e.g., end effectors) of the surgical instrument 50. The holder 46 includes a sliding mechanism 46a, which is configured to move the instrument drive unit 52 along the second longitudinal axis defined by the holder 46. The holder 46 also includes a joint 46b, which rotates the holder 46 relative to the link 42c.

The joints 44a and 44b include an actuator 48a and 48b configured to drive the joints 44a, 44b, 44c relative to each other through a series of belts 45a and 45b or other mechanical linkages such as a drive rod, a cable, or a lever and the like. In particular, the actuator 48a is configured to rotate the robotic arm 40 about a longitudinal axis defined by the link 42a.

The actuator 48b of the joint 44b is coupled to the joint 44c via the belt 45a, and the joint 44c is in turn coupled to the joint 46c via the belt 45b. Joint 44c may include a transfer case coupling the belts 45a and 45b, such that the actuator 48b is configured to rotate each of the links 42b, 42c, and the holder 46 relative to each other. More specifically, links 42b, 42c, and the holder 46 are passively coupled to the actuator 48b which enforces rotation about a pivot point "P" which lies at an intersection of the first axis defined by the link 42a and the second axis defined by the holder 46. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. Some or all of the joints 44a, 44b, and 44c may include an actuator to obviate the need for mechanical linkages.

Figure 4:
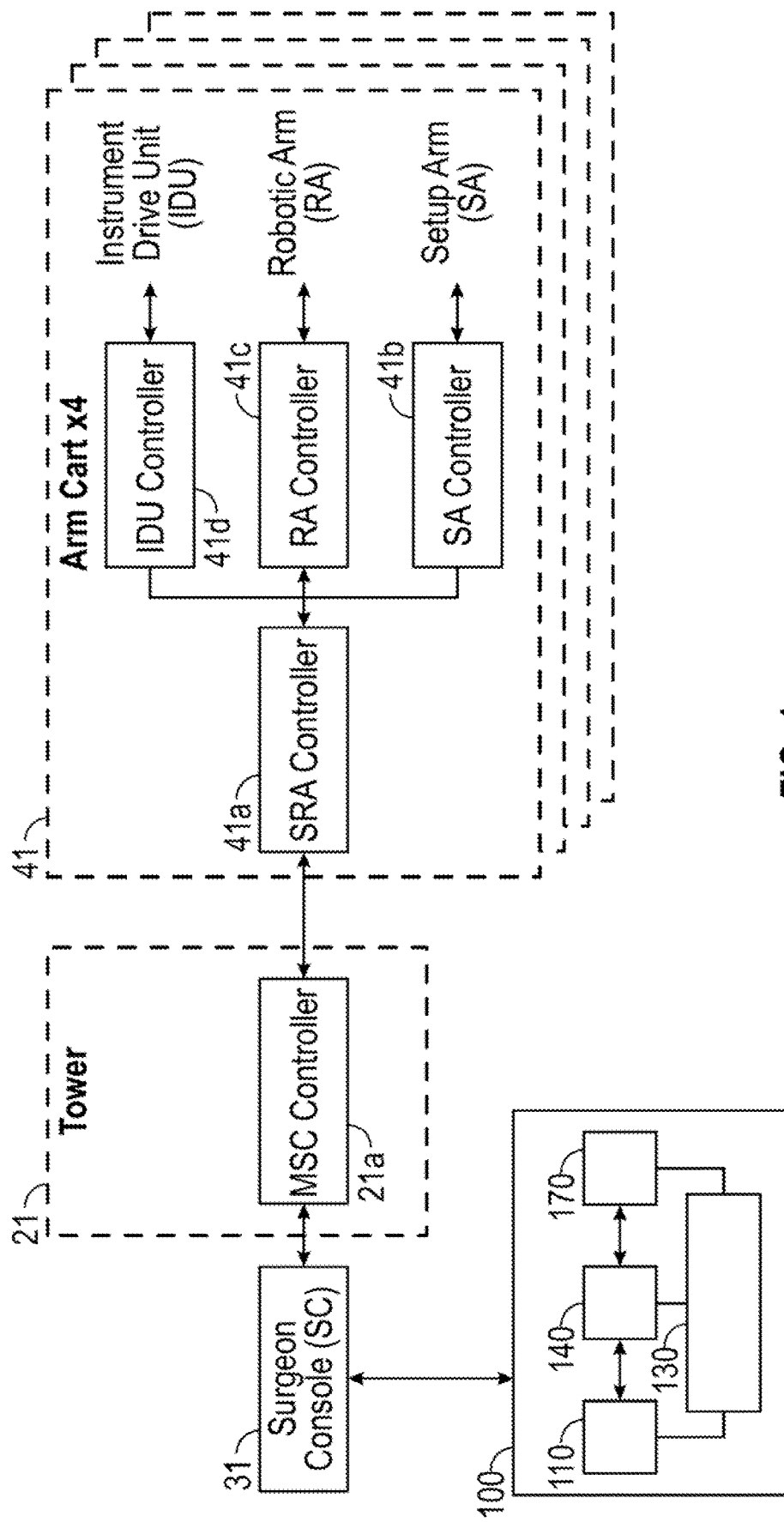
FIG. 4 is a schematic diagram of a computer architecture of the surgical robotic system of FIG. 1 with a training simulator console coupled to a surgeon console.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgical console 30 about the current position and/or orientation of the handle controllers 38a and 38b and the state of the foot pedals 36 and other buttons. The controller 21a processes these input positions to determine desired drive commands for each joint of the robotic arm 40 and/or the instrument drive unit 52 and communicates these to the computer 41 of the robotic arm 40. The controller 21a also receives back the actual joint angles and uses this information to determine force feedback commands that are transmitted back to the computer 31 of the surgical console 30 to provide haptic feedback through the handle controllers 38a and 38b. The safety observer 21b performs validity checks on the data going into and out of the controller 21a and notifies a system fault handler if errors in the data transmission are detected to place the computer 21 and/or the surgical robotic system 10 into a safe state.

The computer 41 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the movable cart 60, the robotic arm 40, and the instrument drive unit 52. The main cart controller 41a also communicates actual joint angles back to the controller 21a.

The setup arm controller 41b controls each of joints 63a and 63b, and the rotatable base 64 of the setup arm 62 and calculates desired motor movement commands (e.g., motor torque) for the pitch axis and controls the brakes. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the instrument drive unit 52. The IDU controller 41d calculates actual angles based on the motor positions and transmits the actual angles back to the main cart controller 41a.

The robotic arm 40 is controlled as follows. Initially, a pose of the handle controller controlling the robotic arm 40, e.g., the handle controller 38a, is transformed into a desired pose of the robotic arm 40 through a hand eye transform function executed by the controller 21a. The hand eye function, as well as other functions described herein, is/are embodied in software executable by the controller 21a or any other suitable controller described herein. The pose of one of the handle controller 38a may be embodied as a coordinate position and role-pitch-yaw ("RPY") orientation relative to a coordinate reference frame, which is fixed to the surgical console 30. The desired pose of the instrument 50 is relative to a fixed frame on the robotic arm 40. The pose of the handle controller 38a is then scaled by a scaling function executed by the controller 21a. In some instances, the coordinate position may be scaled down and the orientation may be scaled up by the scaling function. In addition, the controller 21a also executes a clutching function, which disengages the handle controller 38a from the robotic arm 40. In particular, the main cart controller 21a stops transmitting movement commands from the handle controller 38a to the robotic arm 40 if certain movement limits or other thresholds are exceeded and in essence acts like a virtual clutch mechanism, e.g., limits mechanical input from effecting mechanical output.

The desired pose of the robotic arm 40 is based on the pose of the handle controller 38a and is then passed by an inverse kinematics function executed by the controller 21a. The inverse kinematics function calculates angles for the joints 44a, 44b, and 44c of the robotic arm 40 that achieve the scaled and adjusted pose input by the handle controller 38a. The calculated angles are then passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

With continued reference to FIGS. 1 and 4, the surgical console 30 further includes a training simulation console 100 operably coupled to the surgical console 30. The training simulation console 100 is configured to simulate operation of the surgical robotic system 10 (e.g., clutching, camera control, suturing, and stapling) based on a set of programmable instructions and/or input commands from the surgical console 30 via the handle controllers 38a and 38b and the foot pedals 36. The training simulation console 100 simulates, in response to programmable instructions and/or input commands, virtual instances of the control tower 20, one or more movable carts 60, the robotic arm 40, the surgical instrument 50, and the camera 51 disposed along with the surgical instrument 50 on the robotic arm 40.

The training simulation console 100 may include one or more computers, each including a plurality of controllers, namely, a master slave controller 110, a simulation controller 140, and a simulator 170 operably connected to a shared memory 130. The master slave controller 110 simulates the controller 21a. The shared memory 130 is configured to store session data and instrument information. The session data contains information such as, a scenario name, an initial position of an instrument, name of the instrument, and functionality of the instrument, e.g., whether instruments operate with electrosurgical generators, staple tissue, etc. The initial position of the instrument includes the pivot point "P" e.g., a tool center point (TCP) and joint 46b of holder 46, e.g., the remote center of motion (RCM). Optionally, the name of the instrument may be encoded in a vector look-up table, e.g., 256×1 vector, identified by a numerical number corresponding to an instrument identifier including additional instrument information and may be received from the simulator 170.

The instrument information may include a maximum joint limit, a minimum joint limit of the surgical instrument 50, an appropriate kinematic parameters of the instrument 50 (e.g., jaw offset and wrist length), an actual position of the surgical instrument 50 and camera 51, jaw opening ratios, and active instrument functions. The shared memory 130 may further include additional information, such as, state of the main cart controller 41a, active energy states, and initial exercise information.

Master slave controller 110 and the simulation controller 140 may be implemented in a computer, which may be running a Unix or Linux operating system, e.g., QNX, and the simulator 170 may be implemented in another computer, which may be running WINDOWS® operating system. The master slave controller 110 and the simulator 170 may be interconnected using any suitable communication network based on wired or wireless communication protocols. It should be understood that each of the master slave controller 110, the simulation controller 140, and the simulator 170 may be implemented in any combination of computers, interconnected to the one or more computers using any suitable communication network based on wired or wireless communication protocols. In some instances, the master slave controller 110 and the simulation controller 140 may be interconnected through one or more transmission protocols, including machine-to-machine communication protocols, such as a Data Distribution Service protocol for Real-Time Systems (DDS) including Real-Time Publish Subscribe Protocol (RTPS) enabling scalable, real-time, dependable, high performance, interoperable packet, or data exchanges. In some instances, the master slave controller 110 and the simulator 170 may be setup as virtual machines.

The simulator 170 of the training simulation console 100 simulates the commands and responses of the computer 41 including the main cart controller 41a, the setup arm controller 41b, the robotic arm controller 41c, and the instrument drive unit (IDU) controller 41d to and/or from the master slave controller 110.

The master slave controller 110 simulates the computer 21 of the control tower 20, including the controller 21a. In particular the master slave controller 110 receives session data from simulator 170 to determine desired drive commands for each joint, e.g., of the robotic arm 40 and/or the instrument drive unit 52, and communicates the desired drive commands and the instrument drive unit 52 to a virtual representation of the robotic arm 40 of the main cart controller 41a, which is simulated by the simulator 170 of the training simulation console 100.

The master slave controller 110 may be further configured to receive actual joint angles of the surgical instrument 50 to determine force feedback commands transmitted to the simulator 170 to provide haptic feedback through the handle controllers 38a and 38b of the surgical console 30.

Figure 5:
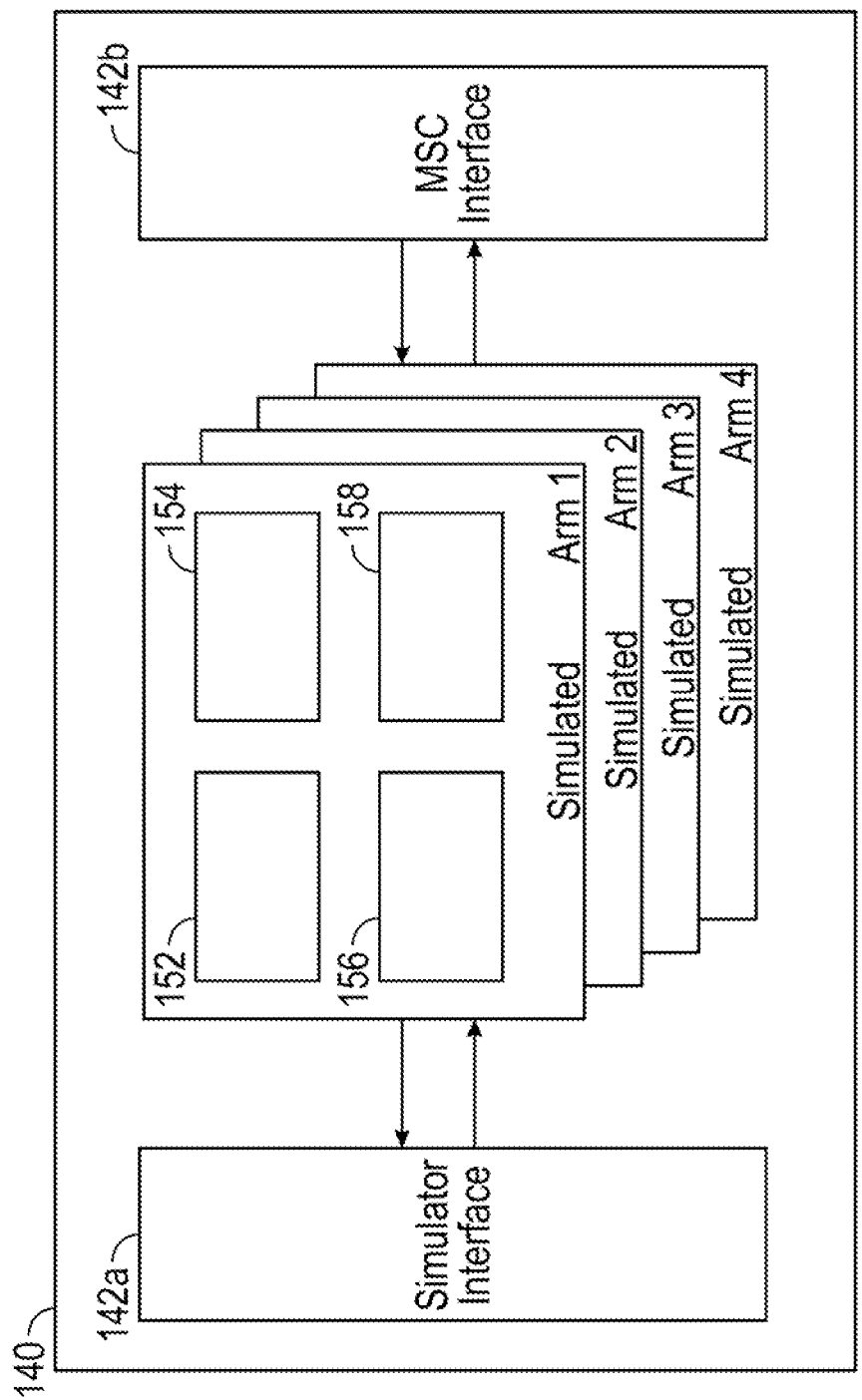
FIG. 5 is a schematic diagram of the training simulator console of the computer architecture of the surgical robotic system of FIG. 1.

With reference to FIG. 5 the simulation controller 140 includes one or more communication interfaces. The communication interfaces include a simulator interface 142a and a master slave controller interface 142b. The simulator interface 142a is coupled to the simulator 170 and facilitates communication between the simulation controller 140 and the simulator 170. The master slave controller interface 142b is coupled to the master slave controller 110 and configured to facilitate communication between the master slave controller 110 and the simulation controller 140. The simulation controller 140 further includes an exercise initializer unit 152, a kinematics algorithm unit 154, a machine state unit 156, and an instrument function handler 158 for each robotic arm 40 simulated in the training simulation console 100. As used herein below, the robotic arm 40 and the associated components, e.g., joints 44a, 44b, 44c, instrument 50, etc. are referenced by the same numerals as the physical counterparts of FIG. 4 for simplicity, however, they are simulated by the simulation controller 140.

The machine state unit 156, based on commands received from the master slave controller 110, is configured to determine the appropriate action in the simulator 170 corresponding with a machine state. The machine state unit 156 may include one or more states, such as a registration state, a tele-robotic operation control state, and instrument specific states, e.g., a clip applier state, an electrosurgical state, and a stapler state. The registration state includes an "unregistered" and "registered" state. The registration state is initially set to a default state of "unregistered," when the session is not active, and the simulated movable cart is placed in a bedside active state to prevent tele-robotic operation control. When the session is active, the registration state is changed from "unregistered" to "registered" to allow tele-robotic operation control. The instrument specific states, may include: "disabled," "wait clip reload," and "reload animation" for a clip applier; "disabled," "enabled," "idle," and "cutting" for electrosurgical forceps; and "disabled," "idle," "advancing," "advancing paused," and "advancing complete" for a stapler.

The tele-robotic operation control state includes a "waiting" and "ready" state. The "ready" state may further include sub-states, such as "hold," "teleoperable," and instrument specific states. The tele-robotic operation control state is initially set to a default state of "waiting" until the session is active. When the session is active, the tele-robotic operation control state is changed from "waiting" to "ready," indicating to the master slave controller 110 that the movable cart is ready for tele-robotic operation with a sub-state of "hold" until the movable cart receives a command from the master slave controller 110 to enter tele-robotic operation. When tele-robotic operation is entered, the sub-state is changed from "hold" to "teleoperable" state. The sub-state may be changed back and forth from "hold" to "teleoperable," based on a command received from the master slave controller 110. If the instrument 50 is a stapler and in the process of being reloaded, the sub-state may be changed from "teleoperable" to "reload animation" to disable tele-robotic operation during the reload animation.

The instrument function handler 158 maps instrument specific commands from the master slave controller 110 and the states from the machine state unit 156 to corresponding instrument functions within the training simulation console 100. The state of instrument 50 is received from the machine state unit 156. Based on the received state of instrument 50 and the specific command from the master slave controller 110, the command from the master slave controller 110 is mapped to the appropriate corresponding simulated instrument 50. The kinematics algorithm unit 154 is configured to perform kinematic calculations, such as inverse and forward kinematic calculations.

The exercise initializer unit 152 is configured to obtain the stored session data and instrument information from the simulator 170 to calculate an orientation and joint positions of joints 44a, 44b, and 44c of the simulated robotic arm 40 in a virtual fixed frame. The virtual fixed frame is a virtual representation of the fixed frame on the robotic arm 40, including one or more subset frames, such as, a TCP frame and an RCM frame. In some systems, the active instrument functions may be determined based on applying bit-masking to the incoming data corresponding to various functionality of the instruments, e.g., electrosurgical generators, staple tissue, etc.

To calculate the orientation of robotic arm 40, the initial instrument information, including an initial position of the instrument 50 and camera 51 is determined based on the initial TCP position relative to the RCM position. Instrument distances are calculated based on the difference between the initial TCP position and the RCM position (RCM-TCP). Based on the calculated instrument distances, x-direction (RCM-$TCP_x$), y-direction (RCM-$TCP_y$), and z-direction (RCM-$TCP_z$) are calculated. Thus, the x-direction, y-direction, the z-direction, and the initial TCP position are combined to create an initial instrument pose (e.g., position and orientation). The initial instrument pose is post-multiplied by a transformation matrix to compensate for the hand eye coordination implemented in the master slave controller 110, resulting in an initial position of camera 51.

To calculate the initial joint positions of joints 44a, 44b, 44c of the simulated robotic arms 40, the kinematic algorithm unit 154 calculates a subset of the joints of the simulated robotic arms 40 (e.g., joints 44a, 44b, and 44c) from the RCM-TCP distances while the remaining joints are set to zero (0). The calculated subset of the joints 44a, 44b, and 44c of the robotic arms 40 is further processed through the kinematic algorithm unit 154 to calculate the TCP in the RCM frame for each instrument 50 and camera 51. The inverse of the calculated TCP in the RCM frame provides the RCM in the TCP frame. To determine the orientation of each simulated robotic arm 40 based in the virtual fixed frame, the RCM in the TCP frame is post-multiplied by initial pose of instrument 50 and camera 51, the results may be used in the master slave controller 110 to calculate the hand eye coordination, as well as further calculation in the kinematic algorithm unit 154.

The kinematic algorithm unit 154 is further configured to calculate a desired simulated instrument poses from a desired joint positions of the robotic arm 40 and an actual joint positions of the robotic arm 40 from actual poses of simulated instrument 50. The desired joint position of the robotic arm 40 is obtained from a position of the handle controllers 38a and 38b and/or foot pedals 36. The position of the handle controllers 38a and 38b and/or foot pedals 36 may include coordinate position and RPY orientation to a coordinate in the surgical console 30 relative to the robotic arm 40 in a virtual fixed frame. The kinematic algorithm unit 154 calculates the desired positions of instrument 50 utilizing the desired joint positions of the robotic arm 40 from the master slave controller 110. The resulting desired poses of instrument 50 are post-multiplied with the RCM in the virtual fixed frame. In calculating the desired poses of camera 51, the desired poses of instrument 50 are further post-multiplied with the transpose of the calculated hand eye coordination in the master slave controller 110. In order to obtain the desired joint positions of the robotic arm 40, a switch having a time threshold may be implemented to ensure that the actual joint positions of the robotic arm 40 are initialized via the master slave controller 110 at the start of each exercise.

The kinematic algorithm unit 154 calculates the joint positions of the robotic arm 40 based on an average of the obtained actual positions of instrument 50 and the desired positions of instrument 50 post-multiplied with the inverse of the RCM in the virtual fixed frame. The joint positions of the robotic arm 40 are further configured to be transmitted to the master slave controller 110 to determine force feedback.

The simulation controller 140 may further include timing configured to indicate the start and end of a session. In aspects, the simulation controller 140 may further include master slave controller writer configured to transmit the desired and actual joint positions based on the machine state. In the event, the simulation controller 140 is in a tele-robotic operable state, the actual joint positions of the robotic arm 40 are transmitted to the master slave controller 110 for force feedback calculations. Otherwise, the desired joint positions of the robotic arm 40 are transmitted to the master slave controller 110 to disable force feedback. In some systems, the simulation controller 140 further includes a GUI writer to transmit information (e.g., robotic arm status, camera head state, and registration confirmed status) to a GUI subsystem of the second display device 34a. The information displayed by the second display device 34a is displayed during an active session allowing input from the user. In some instances, the simulation controller 140 may further include a master slave controller reader configured to obtain the desired joint positions of the robotic arm 40 and commands from the master slave controller 110.

The simulation controller 140 may further include a simulator writer configured to transmit poses of instrument 50 and/or camera 51, jaw angles, and active instrument functions to the shared memory 130 for further calculation. The training simulation console 100 may further includes additional software components found in a physical surgical robotic system, such as logging and data management, process and deployment, graphical user interface, alarms and notifications, surgeon console software subsystem, and master-slave control software subsystem software.

In operation, the training surgical console 100 is coupled to the surgical console 30. The user selects a training exercise in the training surgical console 100. The simulator 170 of the training surgical console 100 initializes a session. The start of the session may be flagged by the timing control feature of the simulation controller 140. The exercise initializer unit 152 initializes the session by calculating an initial instrument and camera positions based on the initial TCP and initial RCM positions. The simulator writer may transmit the initial instrument and camera positions to the simulator 170 to initialize the session. The session data and instrument information are read from the shared memory 130 by simulation controller 140. The simulation controller 140 calculates actual joint positions of the robotic arm 40 based on the actual positions of instrument 50 from the instrument information read from the shared memory 130 by simulation controller 140. The master slave controller writer may transmit and write the calculated actual joint positions of the robotic arm 40 to the master slave controller 110 for force feedback, in particular, in the event that a command is received from the master slave controller 110 indicating that the machine state of the simulation controller 140 is in a tele-robotic operable state. The master slave controller 110 receives desired joint positions of the robotic arm 40 and commands from the user input, and the simulation controller 140 calculates desired poses of instrument 50 and camera 51 based on the desired joint positions of the robotic arm 40 and commands. The master slave controller reader may obtain the desired joint positions of the robotic arm 40 and commands from the master slave controller 110. The master slave controller writer may transmit the desired joint positions of the robotic arm 40 calculated to the master slave controller 110 to disable force feedback, in particular, in the event that commands are received from the master slave controller 110 indicating that the machine state of the simulation controller 140 is in a tele-robotic non-operable state. The surgical robotic system 10, the simulator 170 displays the simulation of the robotic arm 40, on the first display 32 of the surgical console. The instrument function handler 158, based on the received commands from the master slave controller 110, maps the corresponding command with an instrument function within the simulator 170. To map the corresponding commands with the instrument function within the simulator 170, the simulation controller 140 determines which robotic arm 40 and instrument drive unit 52 to simulate, determines the machine state of the robotic arm 40, and instrument drive unit 52.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:
1. A surgical robotic system comprising:
   a surgical console including a display and a user input device configured to generate a user input; and
   a training simulation console operably coupled to the surgical console, the training simulation console including:

a memory configured to store session data and instrument information;

a simulator configured to initialize a session simulating a plurality of movable carts each having a robotic arm having an instrument drive unit holding at least one of a camera or an instrument;

a master slave controller configured to:
switch a registration state of a selected movable cart with the surgical console between a default unregistered state and a registered state, wherein during the unregistered state the selected movable cart is not teleoperable and during the registered state the selected movable cart is teleoperable;
receive input positions from the user input device and to determine a drive command for at least one of a movable cart, a robotic arm, or an instrument drive unit; and a simulation controller operably coupled to the simulator and the master slave controller, the simulation controller configured to simulate during the session, operation of at least one of the robotic arm or the instrument drive unit.

2. The surgical robotic system according to claim 1, wherein the simulation controller is further configured to determine an initial instrument pose and an initial camera pose based on the session data and the instrument information.

3. The surgical robotic system according to claim 1, wherein the simulation controller is further configured to determine an appropriate action of at least one of the movable cart, the robotic arm, or the instrument drive unit based on a machine state.

4. The surgical robotic system according to claim 3, wherein the simulation controller is further configured to map the drive command for at least one of the robotic arm or the instrument drive unit based on the machine state, to an instrument function in the simulator.

5. The surgical robotic system according to claim 1, wherein the simulation controller is further configured to determine an orientation of at least one of the movable cart, the robotic arm, or the instrument drive unit in the session.

6. The surgical robotic system according to claim 5, wherein the orientation of at least one of the movable cart, the robotic arm, or the instrument drive unit is determined based on an initial tool center point position relative to a remote center of motion position.

7. The surgical robotic system according to claim 1, wherein a desired instrument position is determined based on the drive command for the at least one of the robotic arm or the instrument drive unit.

8. The surgical robotic system according to claim 1, wherein the session data includes at least one of a scenario name, an initial position of an instrument, name of the instrument, or functionality of the instrument.

9. The surgical robotic system according to claim 1, wherein the instrument information includes at least one of a maximum joint limit, a minimum joint limit, or a kinematic parameter.

10. The surgical robotic system according to claim 1, wherein the master slave controller is further configured to provide haptic feedback to the user input device based on virtual movement of at least one of the robotic arm or the instrument drive unit.

11. A method of simulating surgical techniques of a surgical robotic system, the method comprising;

receiving, at a surgical console, input positions and drive commands from a user;

receiving session data and instrument information at a training simulation console operably coupled to the surgical console and initializing a session simulating a plurality of movable carts each having a robotic arm having an instrument drive unit holding at least one of a camera or an instrument;

switching a registration state of a selected movable cart with the surgical console between a default unregistered state and a registered state, wherein during the unregistered state the selected movable cart is not teleoperable and during the registered state the selected movable cart is teleoperable; and simulating during the session, based on the session data, the instrument information, the input positions and the drive command, operation of at least one of a movable cart, a robotic arm, or an instrument drive unit of the surgical robotic system on a display.

12. The method according to claim 11, wherein the session data includes at least one of a scenario name, an initial position of an instrument, name of the instrument, or functionality of the instrument.

13. The method according to claim 11, wherein the instrument information includes at least one of a maximum joint limit, a minimum joint limit, or a kinematic parameter.

14. The method according to claim 11, wherein initializing the session on the training simulation console includes determining, based on the session data and the instrument information, an initial instrument pose and an initial camera pose.

15. The method according to claim 11, wherein simulating the operation of at least one of the movable cart, the robotic arm, or the instrument drive unit includes determining, based on a machine state, an appropriate action for at least one of the movable cart, the robotic arm, or the instrument drive unit.

16. The method according to claim 15, wherein simulating the operation of at least one of the movable cart, the robotic arm, or the instrument drive unit includes mapping, based on the machine state, the drive command for at least one of the movable cart, the robotic arm, or the instrument drive unit to an instrument function.

17. The method according to claim 11, wherein simulating the operation of at least one of the movable cart, the robotic arm, or the instrument drive unit includes determining an orientation of at least one of the movable cart, the robotic arm, or the instrument drive unit in the session.

18. The method according to claim 17, wherein the orientation of at least one of the movable cart, the robotic arm, or the instrument drive unit is determined based on an initial tool center point position relative to a remote center of motion position.

19. The method according to claim 11, wherein simulating the operation of at least one of the movable cart, the robotic arm, or the instrument drive unit includes determining a desired instrument pose, based on the drive command, of at least one of the movable cart, the robotic arm, or the instrument drive unit.

20. The method according to claim 11, further comprising providing haptic feedback to the user based on a virtual movement of at least one of the robotic arm or the instrument drive unit.

* * * * *